United States Patent
Masters et al.

(10) Patent No.: US 7,171,108 B1
(45) Date of Patent: Jan. 30, 2007

(54) AUDIOVISUAL SYSTEM TO INTERRUPT VIEWING OF A FIRST AUDIOVISUAL PROGRAM TO PROVIDE NOTIFICATION OF A SECOND AUDIOVISUAL PROGRAM OF INTEREST TO THE USER

(75) Inventors: Bradley S. Masters, Mission Viejo, CA (US); Russell M. Krapf, Dana Point, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 1154 days.

(21) Appl. No.: 09/920,772

(22) Filed: Jul. 31, 2001

(51) Int. Cl.
*H04N 5/91* (2006.01)
(52) U.S. Cl. .......................... 386/83; 386/95
(58) Field of Classification Search ................ 386/46, 386/83, 125, 126; 725/9, 52
See application file for complete search history.

(56) References Cited

U.S. PATENT DOCUMENTS 6,177,931 B1 * 1/2001 Alexander et al. ............ 725/52

2002/0152459 A1 * 10/2002 Bates et al. ..................... 725/9

FOREIGN PATENT DOCUMENTS

JP          08-032955       *  2/1996

* cited by examiner

*Primary Examiner*—Huy Nguyen
(74) *Attorney, Agent, or Firm*—Jason T. Evans, Esq.; Knobbe, Martens, Olson & Bear

(57) ABSTRACT

An audiovisual system and a method make audiovisual programs available to a user and present on a display device a first available audiovisual program selected from the available audiovisual programs. The audiovisual system includes a disk drive and a preference determination module. The preference determination module estimates a degree of interest for each available audiovisual program. The audiovisual system further includes an alert module that generates an interrupt signal in response to the degrees of interest of the available audiovisual programs. The audiovisual system further includes a system controller responsive to user input and electronic program guide information to present the first available audiovisual program to the user. The system controller is further responsive to the interrupt signal from the alert module to interrupt presenting the first available audiovisual program to provide information to the user regarding at least a second available audiovisual program.

18 Claims, 5 Drawing Sheets

FIGURE 3:

| Program | User 1 | User 2 | User 3 |
|---------|--------|--------|--------|
| A | 10 | 12 | 30 |
| B | 98 | 21 | 15 |
| C | 75 | 17 | 79 |
| ⋮ | ⋮ | ⋮ | ⋮ |
| X | 82 | 9 | 67 |
| Y | 13 | 88 | 6 |
| Z | 41 | 97 | 54 |
| ⋮ | ⋮ | ⋮ | ⋮ |

AUDIOVISUAL SYSTEM TO INTERRUPT VIEWING OF A FIRST AUDIOVISUAL PROGRAM TO PROVIDE NOTIFICATION OF A SECOND AUDIOVISUAL PROGRAM OF INTEREST TO THE USER

BACKGROUND OF THE INVENTION

1. Field of the Invention

The invention relates to a system for displaying audiovisual programs to a viewer, and more particularly, to a system and method for displaying audiovisual programs of interest to the viewer.

2. Description of the Related Art

A conventional audiovisual system for receiving and displaying audiovisual programs includes a set-top box connectable to a display device, such as a monitor or a television (TV) set. The set-top box is connected to a multiple-service operator (MSO), such as a cable TV network or a satellite TV system, which provides audiovisual programs to be viewed. The TV set and the set-top box are located, for example, in a viewer's home and receive a multitude of TV channels from a broadcast head end, wherein each TV channel has a multitude of audiovisual programs during a typical day. In order to select and watch a certain audiovisual program, the viewer usually uses a remote control interface to control at least the set-top box to tune to a desired channel. The display device receives an audiovisual program of the desired channel from the set-top box and displays the audiovisual program as it is received from the broadcast head end to the viewer.

A viewer can expand the audiovisual system described above by connecting a video recorder between the display device and the set-top box to record an audiovisual program and view it at a later time which is more convenient for the viewer. Thus, the viewer's television viewing can be personalized by overcoming the rigid broadcast time schedules for the audiovisual programs. The video recorder may be a digital video recorder that includes a hard disk drive with a storage capacity of between approximately 10 GB and 30 GB for recording up to approximately thirty hours of audiovisual programs.

In addition to using a video recorder, alternative audiovisual systems provide for even more flexibility and viewer-specific viewing options. For example, digital video recorders (also referred to as personal video recorders, or PVRs) offered by Replay Networks (in combination with the ReplayTV service) and by Philips (in combination with the TiVo service) allow personalization of the viewer's television viewing. For example, the PVR can effectively anticipate which audiovisual programs are of interest to the viewer by tracking various characteristics of the audiovisual programs preferred by the viewer, and automatically record subsequently broadcasted audiovisual programs which have these characteristics. In addition, the PVR provides the capability of responding to user input by pausing the display of an audiovisual program being viewed as it is received from the broadcast head end (i.e., live TV), and by recording the audiovisual program for later viewing. For example, when the viewer is interrupted from viewing live TV, the viewer can pause and record the audiovisual program, then resume viewing the audiovisual program later exactly where the viewer left off.

The number of channels and audiovisual programs available to viewers is continually increasing beyond levels which viewers are able to track and select for viewing. Conventional systems enable viewers to receive hundreds of channels, including premium subscription channels, pay-per-view services, or video-on-demand services. Viewers using conventional systems must repeatably reference program guide information, making multiple decisions as to which audiovisual programs to watch, and multiple manual changes of channels during a viewing session to continue to watch audiovisual programs of interest to the viewer. There is therefore a need to improve upon the prior art technique for presenting information regarding the available audiovisual programming to the viewer so that it is more likely that the viewer can watch audiovisual programs of interest.

SUMMARY OF THE INVENTION

One aspect of the present invention involves an audiovisual system for making audiovisual programs available to a user from a broadcast source and from local storage and for presenting on a display device a first available audiovisual program selected from the available audiovisual programs. The audiovisual system comprises a disk drive adapted to receive and store audiovisual programs and to retrieve and transmit stored audiovisual programs. The audiovisual system further comprises a preference determination module responsive to user input and electronic program guide information to estimate a degree of interest by the user for each available audiovisual program. The audiovisual system further comprises an alert module coupled to the preference determination module. The alert module generates an interrupt signal in response to the degrees of interest of the available audiovisual programs. The audiovisual system further comprises a system controller coupled to the alert module. The system controller is responsive to user input and electronic program guide information to present the first available audiovisual program to the user. The system controller is further responsive to the interrupt signal from the alert module to interrupt presenting the first available audiovisual program to provide information to the user regarding at least a second available audiovisual program.

Another aspect of the present invention involves a method of allowing a user to select among available audiovisual programs while viewing a first audiovisual program on a display device coupled to an audiovisual system. The method comprises presenting the first audiovisual program to the user. The method further comprises generating at least one threshold interest criterion. The method further comprises estimating a degree of interest by the user for the first audiovisual program and each available audiovisual program. The method further comprises comparing the degree of interest for each availableaudiovisual program with the threshold interest criterion. The method further comprises presenting information to the user regarding at least a second available audiovisual program which has a degree of interest which satisfies the threshold interest criterion.

BRIEF DESCRIPTION OF THE DRAWINGS

FIG. 3 schematically illustrates a user profile table in accordance with an embodiment of the present invention.

DETAILED DESCRIPTION OF THE PREFERRED EMBODIMENT

Figure 1:
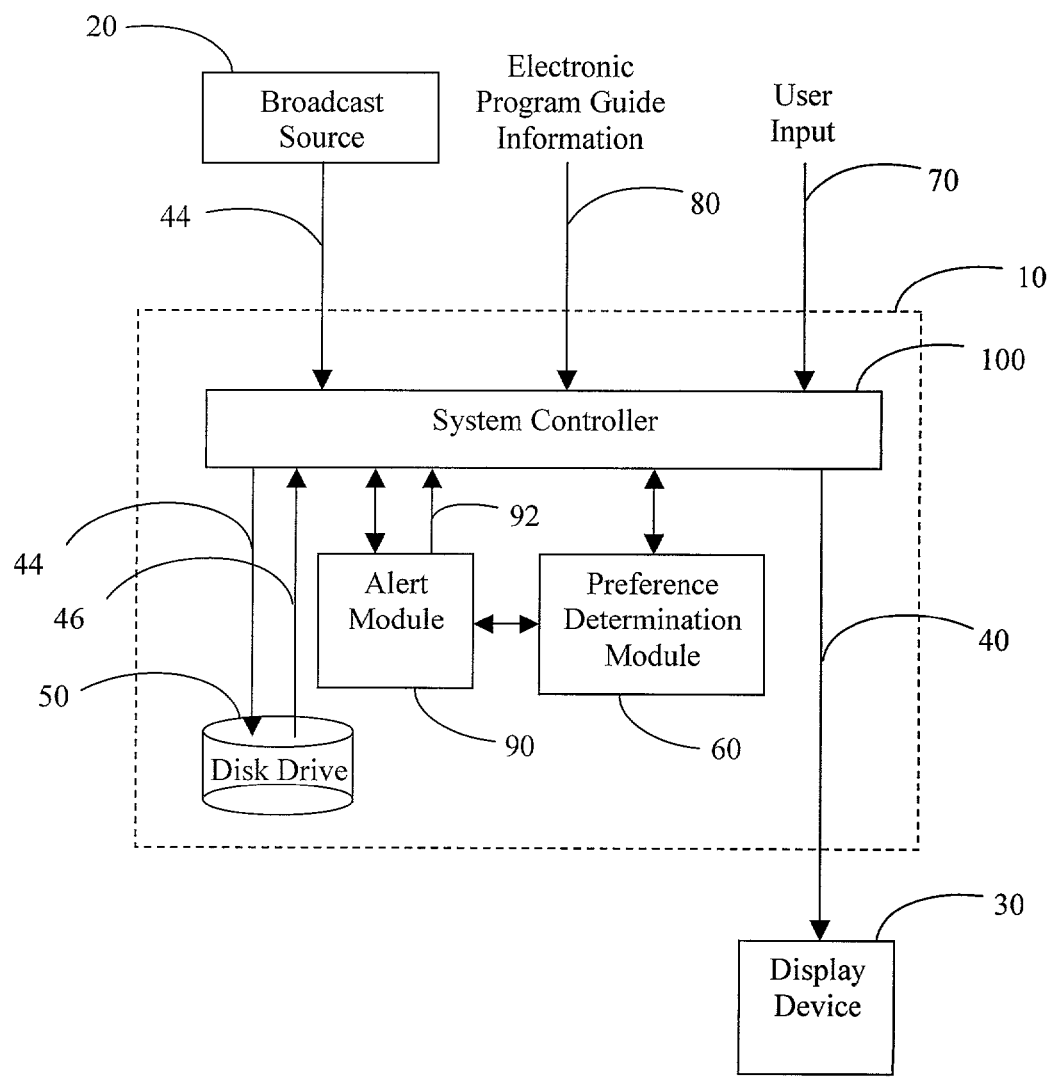
FIG. 1 is a high-level block diagram which schematically illustrates an audiovisual system in accordance with an embodiment of the present invention.

As schematically illustrated in the high-level block diagram of FIG. 1, one embodiment of the present invention comprises an audiovisual system 10 for making audiovisual programs available to a user from a broadcast source 20 and from local storage and for presenting on a display device 30 a first available audiovisual program 40 selected from the available audiovisual programs. The audiovisual system 10 comprises a disk drive 50 adapted to receive and store audiovisual programs 44 and to retrieve and transmit stored audiovisual programs 46. The audiovisual system 10 further comprises a preference determination module 60 responsive to user input 70 and electronic program guide information 80 to estimate a degree of interest by the user for each available audiovisual program. The audiovisual system 10 further comprises an alert module 90 coupled to the preference determination module 60. The alert module 90 generates an interrupt signal 92 in response to the degrees of interest of the available audiovisual programs. The audiovisual system 10 further comprises a system controller 100 coupled to the alert module 90. The system controller 100 is responsive to user input 70 and electronic program guide information 80 to present the first available audiovisual program 40 to the user. The system controller 100 is further responsive to the interrupt signal 92 from the alert module 90 to interrupt presenting the first available audiovisual program 40 to provide information to the user regarding at least a second available audiovisual program.

In certain embodiments of the present invention, the audiovisual system 10 is connectable to a broadcast source 20 which transmits audiovisual programs 44 to the audiovisual system 10. Examples of such broadcast sources 20 include, but are not limited to, cable television systems and satellite systems. Alternatively, the audiovisual programs 44 can be received from UHF or VHF broadcast signals using an antenna.

Figure 2:
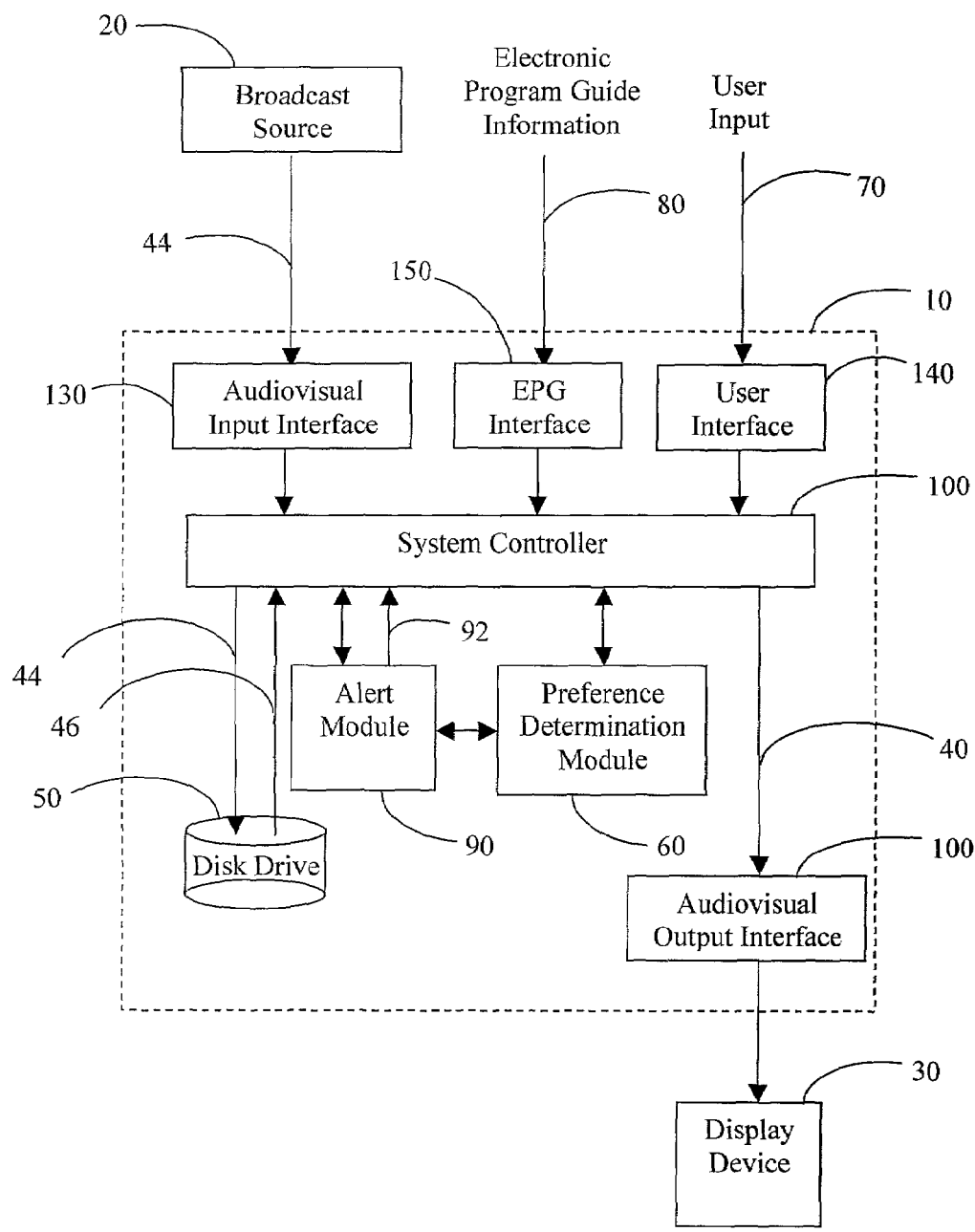
FIG. 2 schematically illustrates an audiovisual system in accordance with another embodiment of the present invention.

As schematically illustrated in FIG. 2, the audiovisual system 10 of certain embodiments comprises an audiovisual input interface 130 which receives the audiovisual programs 44 from the broadcast source 20. In certain embodiments, the audiovisual input interface 130 comprises an MPEG (Motion Pictures Experts Group) encoder, which generates compressed digitally-formatted streaming data segments in response to analog-formatted audiovisual programs 44 from the broadcast source 20, and which communicates the compressed digitally-formatted streaming data segments to the system controller 100. Furthermore, for particular embodiments that are compatible with encrypted audiovisual programs 44 from the broadcast source 20 (e.g., audiovisual programs from premium cable channels), the audiovisual input interface 130 comprises a decrypter. Alternatively, in other embodiments of the present invention, the encoding and decrypting features described above may instead by performed by the system controller 100, or by some other device upstream of the audiovisual system 10. Persons skilled in the art are able to provide an audiovisual input interface 130 that receives and appropriately responds to the audiovisual programs 44 received from the broadcast source 20 in accordance with embodiments of the present invention.

The audiovisual system 10 of certain embodiments comprises a user interface 140 which receives the user input 70, as schematically illustrated in FIG. 2. By receiving user input 70, the user interface 140 permits the user to indicate to the audiovisual system 10 which audiovisual programs to record from the broadcast source 20, and which audiovisual program is the first available audiovisual program 40 selected from the available audiovisual programs for viewing on the display device 30. In addition, the user input 70 received by the user interface 140 permits the user to control various other operation parameters of the audiovisual system 10, such as playback commands (e.g., pause, instant-replay, etc.). In certain embodiments, the user interface 140 can be used to communicate at least one variable parameter to the system controller 100, such as the identities of the users currently using the audiovisual system 10. These identifications can be used by the audiovisual system 10 to track user preferences and to respond appropriately as described more fully below. Examples of the user interface 140 include, but are not limited to, a remote control keypad device, or a keypad wired directly to the audiovisual system 10. Persons skilled in the art are able to select an appropriate communication technology for the user interface 140 in accordance with embodiments of the present invention.

The audiovisual system 10 of certain embodiments comprises an electronic program guide (EPG) interface 150, as schematically illustrated in FIG. 2, which receives EPG information 80 which is transmitted to the system controller 100. EPG information 80 can be displayed to the user in a variety of forms on the display device 30, thereby providing the user with information regarding the content of audiovisual programs currently being broadcasted or yet to be broadcast. In certain embodiments, the EPG information 80 is a database containing information regarding the broadcast schedules for various audiovisual programs from various broadcast channels. This information is typically expressed in the form of a program grid with columns denoting the time periods, and with separate rows for each of the available broadcast channels. Each cell of the program grid can contain information regarding an audiovisual program including, but not limited to, the title, genre of the program, principal actors, director, and brief synopsis.

In one embodiment, the EPG information 80 is generated by a separate source from that of the audiovisual programs 44 received from the broadcast source 20, and the EPG interface 150 is a separate interface (e.g., a phone line connection interface) from the audiovisual input interface 130. Alternatively, in other embodiments where the EPG information 80 is generated by the broadcast source 20 and transmitted along with the audiovisual programs 44, the EPG interface 150 is part of the audiovisual input interface 130. Typically, in order to enable a user to utilize the EPG information 80, the audiovisual system 10 displays the program grid directly on the display device 30 being viewed by the user. The user may then provide appropriate user input 70 to the system controller 100 via the user interface 140. The system controller 100 then uses the EPG information 80 to select the first available audiovisual program 40 in response to the user input 70. Persons skilled in the art are able to select an appropriate configuration of the EPG interface 150 and to select the method of communicating the EPG information 80 to both the user and the system controller 100 in accordance with embodiments of the present invention.

The audiovisual system 10 of certain embodiments comprises an audiovisual output interface 160 coupled to the system controller 100 and connectable to the display device 30, as schematically illustrated in FIG. 2. In certain embodiments, the display device 30 comprises a television. The audiovisual output interface 160 transmits data and audiovisual programs from the system controller 100 to the display device 30 in a format compatible with the display device 30. In this way, the system controller 100 can display to the user audiovisual programs and graphical-user interfaces with EPG information 80, or other system information. Persons skilled in the art are able to select an appropriate configuration of the audiovisual output interface 160 in accordance with embodiments of the present invention.

The disk drive 50 of the audiovisual system 10 is coupled to the system controller 100 and provides local storage for audiovisual programs and various other system information. In certain embodiments of the present invention, the disk drive 50 is compatible with a version of the ATA (AT-attachment) standard, such as IDE (Integrated Drive Electronics). In other embodiments, the disk drive 50 is compatible with the SCSI (Small Computer System Interface) standard. In still other embodiments, the disk drive 50 is compatible with the IEEE 1394 standard, which is described in the "IEEE Std 1394-1995 IEEE Standard for a High Performance Serial Bus," Aug. 30, 1996, which is incorporated in its entirety by reference herein. Alternatively, the disk drive 50 can be a writable digital video disk (DVD) drive, or another technology that provides writable non-volatile storage.

The system controller 100 of certain embodiments is in control of the various operations of the audiovisual system 10, as well as what is displayed to the user at any given time. In certain embodiments, the system controller 100 comprises a microprocessor. In response to user input 70 and EPG information 80, the system controller 100 can select the first available audiovisual program 40 from the available audiovisual programs. The system controller 100 can also present the first available audiovisual program 40 to the user by routing the first available audiovisual program 40 via the audiovisual output interface 160 onto the disk drive 50.

In response to user input 70 and EPG information 80, the system controller 100 can also select which audiovisual programs 44 to route to the disk drive 50 to store for later viewing. In embodiments in which the disk drive 50 is an IDE disk drive, the system controller 100 maintains a directory of the physical locations of the various stored audiovisual programs 46 on the disk drive 50. Typically, this information is in the form of a file allocation table that contains a list of file names and the linked clusters for each file name. In other embodiments, the system controller 100 instead maintains a directory of logical locations that the disk drive 50 translates into physical locations.

The audiovisual system 10 of certain embodiments comprises a preference determination module 60 which comprises an algorithm, enabled in hardware, software, or both, which uses a user's viewing patterns to create a user profile of the user's viewing preferences. The preference determination module 60, which in certain embodiments can be resident in the system controller 100, can be configured to automatically monitor the viewing habits of the user without further input from the user, and to automatically store audiovisual programs of interest on the disk drive 50. In such embodiments, it is especially important to clearly communicate to the user which audiovisual programs are available since a subset of the available audiovisual programs will have been recorded without user intervention.

Based on the user profile and the EPG information 80 for the broadcast schedule, the preference determination module 60 of certain embodiments provides information regarding broadcasted audiovisual programs 44 which the user may be interested in viewing. In addition, the preference determination module 60 can provide information regarding stored audiovisual programs 46. In certain embodiments, information regarding the available audiovisual programs, including the scheduled broadcast times and dates, are communicated to the user to assist the user's selection of which audiovisual programs to view or record. Typically, this information and the parameters used by the preference determination module 60 to create the user profile are communicated to the user via a graphical-user interface presented on the display device 30. Additionally, in certain embodiments, the preference determination module 60 includes algorithms to detect the viewing preferences of multiple users. An example of a preference determination module 60 compatible with the present invention is MbTV™ sold by Metabyte Networks, Inc. of Fremont, Calif.

The preference determination module 60 of certain embodiments estimates a degree of interest ("DOI") by each user for each available audiovisual program. In certain such embodiments, the preference determination module 60 can generate a user profile table 200, schematically illustrated in FIG. 3, which expresses the estimated degrees of interest of each user in the available audiovisual programs as a column 210 of numerical DOI values 220. The available audiovisual programs include the broadcasted audiovisual programs 44 available to be received from the broadcast source 20 within a predetermined time window, and the stored audiovisual programs 46 available to be played back from the disk drive 50. In typical embodiments, the time window can be predetermined to encompass time periods such as the next hour, the next day, or the next week of the broadcast schedule. The set of available audiovisual programs can change due to advancement of the time window during the course of the day, broadcast schedule changes of the broadcasted audiovisual programs 44, or modification of the stored audiovisual programs 46 on the disk drive 50. The preference determination module 60 can maintain an up-to-date user profile table 200 by periodically reestimating the estimated DOI values 220 for each user at predetermined time intervals. Alternatively, the preference determination module 60 can detect changes in the set of available audiovisual programs, estimate the DOI values for the newly available audiovisual programs, and revise the user profile table 200 accordingly.

Figure 3:
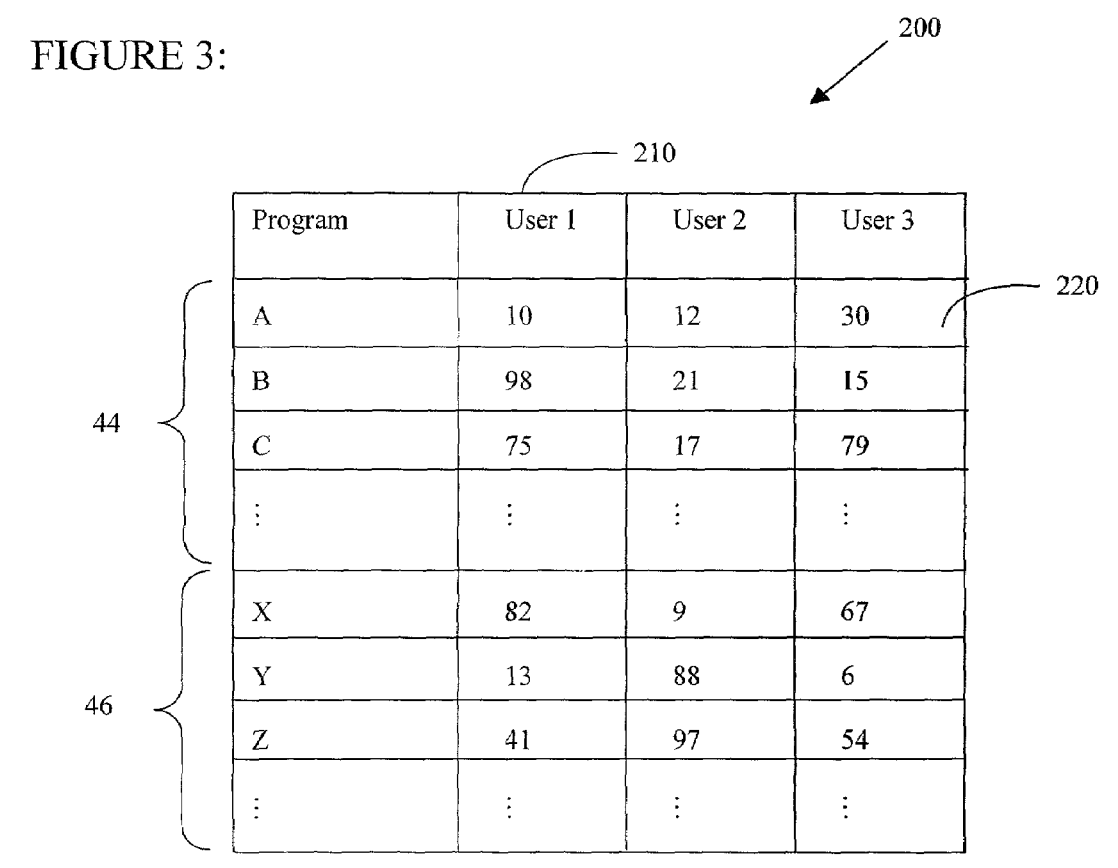

In certain embodiments, the estimated degree of interest of a user in a given audiovisual program is expressed as a numerical integer DOI value 220 between 0 and 100, as schematically illustrated in FIG. 3. In such embodiments, a DOI value of 0 can correspond to an audiovisual program estimated to be of no interest to the user and a DOI value of 100 can correspond to an audiovisual program estimated to be of maximum interest to the user. In alternative embodiments, the preference determination module 60 can use lower integer DOI values to represent higher estimated degrees of interest, or can use non-integer DOI values. Persons skilled in the art are able to configure the preference determination module 60 to express the estimated degrees of interest by the users in the audiovisual programs in accordance with embodiments of the present invention.

For example, as shown in FIG. 3, where the preference determination module 60 has determined that User 1 is interested in science-fiction movies, action movies, and movies starring Harrison Ford, an available audiovisual program having all these characteristics according to the EPG information 80, such as Program B (e.g., "Blade Runner"), would have a DOI value corresponding to a high estimated degree of interest. Similarly, an available audiovisual program having only some of these characteristics, such as Program X (e.g., "The Fugitive"), would have a DOI value corresponding to a lower estimated degree of interest. Persons skilled in the art recognize that the preferences of the user profile can contain many characteristics, which potentially may conflict with one another, such that no audiovisual program can have all the characteristics. In embodiments in which the preference determination module 60 detects the viewing preferences of multiple users, such as schematically illustrated in FIG. 3, the DOI values 220 corresponding to the estimated degrees of interest of User 1 with regard to the available audiovisual programs differ from the DOI values 220 corresponding to the estimated degrees of interest of User 2 with regard to the same available audiovisual programs.

In certain embodiments of the present invention, as schematically illustrated in FIGS. 1 and 2, the audiovisual system 10 comprises an alert module 90 coupled to the preference determination module 60 and the system controller 100. The alert module 90 is responsive to the DOI values 220 of the available audiovisual programs to generate an interrupt signal 92 which is transmitted to the system controller 100. The system controller 100 is responsive to the interrupt signal 92 from the alert module 90 to interrupt presenting the first available audiovisual program 40 to provide information to the user regarding at least a second available audiovisual program.

In certain embodiments, the alert module 90 can be resident in the system controller 100, the preference determination module 60, or other components of the audiovisual system 10. The alert module 90 of certain embodiments comprises an algorithm, enabled in hardware, software, or both, which generates at least one threshold interest criterion in response to user input 70. In embodiments in which the preference determination module 60 detects the viewing preferences of multiple users, the alert module can generate multiple threshold interest criteria. The alert module 90 of certain embodiments compares the DOI values 220 received from the preference determination module 60 to the threshold interest criterion to determine which, if any, of the available audiovisual programs satisfies the threshold interest criterion. If at least one available audiovisual program is identified to satisfy the threshold interest criterion, the alert module 90 generates an interrupt signal 92 and the system controller 100 responds by providing information to the user regarding the identified audiovisual program.

Figure 4:
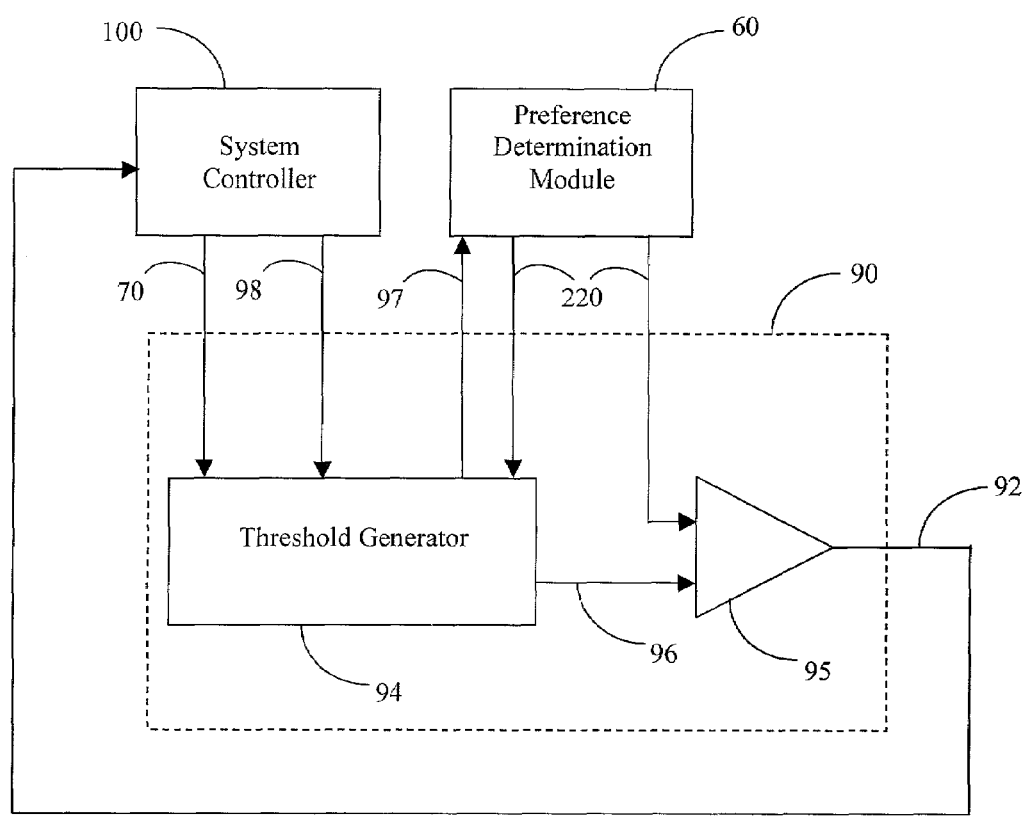
FIG. 4 schematically illustrates an exemplary alert module in accordance with an embodiment of the present invention.

FIG. 4 schematically illustrates an exemplary alert module 90 in accordance with an embodiment of the present invention. The alert module 90 comprises a threshold generator 94 coupled to a comparator 95. The threshold generator 94 is further coupled to the preference determination module 60 to receive the DOI values 220 of the available audiovisual programs. In certain embodiments, the threshold generator 94 uses the DOI values 220, including that of the first available audiovisual program 40 being displayed by the display device 30, to generate the appropriate threshold value 96. In certain embodiments, the preference determination module 60 transmits the DOI values 220 to the threshold generator 94 in response to signals 97 from the threshold generator 94, schematically illustrated in FIG. 4.

The threshold generator 94 of the embodiment schematically illustrated in FIG. 4 is also coupled to the system controller 100 to receive user input 70 and other information, such as the current time 98. User input 70 can be used to provide parameters to control the functioning of the threshold generator 94, including enabling or disabling the threshold generator 94. The current time 98 can be used by the threshold generator 94 to determine which of the audiovisual programs listed by the preference determination module 60 are available to compare to the first available audiovisual program 40 being displayed by the display device 30. In certain embodiments as schematically illustrated in FIG. 4, the threshold generator 94 generates a threshold value 96 which is transmitted to the comparator 95.

Besides receiving the threshold value 96, the comparator 95 of certain embodiments also receives the DOI values 220 from the preference determination module 60, as schematically illustrated in FIG. 4. The comparator 95 then compares the DOI values 220 to the threshold value 96 to identify which available audiovisual programs have DOI values 220 above the threshold value 96 and generates an appropriate interrupt signal 92.

In an exemplary embodiment, the threshold interest criterion for User 1 can be set so that the alert module 90 generates an interrupt signal 92 if the DOI value 220 of an available audiovisual program is greater than or equal to 80. As shown in the user profile table 200 of FIG. 3, broadcasted audiovisual Program B and stored audiovisual Program X would satisfy the threshold interest criterion, so information regarding both of these audiovisual programs would be provided to User 1 by the system controller 100 in response to the interrupt signal 92. Similarly, if the same threshold interest criterion were used for User 2, information regarding stored audiovisual Program Y and Program Z would be provided to User 2 by the system controller 100 in response to the interrupt signal 92. For User 3, none of the listed available audiovisual programs satisfies the threshold interest criterion, so the system controller 100 would not provide User 3 with information regarding any of the listed available audiovisual programs. Persons skilled in the art recognize that different threshold interest criteria can be used for different users.

Similarly, the threshold interest criterion of certain embodiments can be based on the DOI value 220 of the first available audiovisual program 40 being displayed by the display device 30. In such embodiments, the system controller 100 would respond to the interrupt signal 92 from the alert module 90 only if at least one of the available audiovisual programs has an estimated degree of interest higher than that of the first available audiovisual program 40. For example, if User 1 is viewing stored audiovisual Program X, information regarding broadcasted audiovisual Program B would be provided to User 1 by the system controller 100 in response to the interrupt signal 92. In this way, the user is notified of the availability of audiovisual programs which the user may prefer to view rather than what is currently being viewed. In certain embodiments, the threshold interest criterion is expressed as a difference from the DOI value 220 of the first available audiovisual program 40 (e.g., the threshold interest criterion is satisfied only for audiovisual programs with DOI values 220 more than 10 higher than that of the first available audiovisual program 40). In still other embodiments, the threshold interest criterion can comprise various dependencies on set values and the DOI values of the available audiovisual programs and the first available audiovisual program. Persons skilled in the art are able to configure a threshold interest criterion in accordance with embodiments of the present invention.

As described above, the threshold interest criterion of certain embodiments is used to initiate the presentation of information to the user regarding available audiovisual programs based on the estimated degrees of interest of the available audiovisual programs 40 displayed. In certain embodiments, this information is presented to the user via a graphical-user interface displayed on the display device 30, which partially or completely interrupts the user's viewing of the first available audiovisual program 40. The graphical-user information can present the information to the user in various forms including, but not limited to, picture-in-picture format, a banner message, or an interrupt message flag. Persons skilled in the art are able to select an appropriate graphical-user interface in accordance with embodiments of the present invention.

In certain embodiments, the alert module 90 is further responsive to user input 70 so that the user can choose to not have the viewing of the first available audiovisual program 40 interrupted. For example, a user wishing to receive information regarding only audiovisual programs with a high estimated degree of interest can set the threshold interest criterion to be satisfied by a high value (e.g., 80). A user wishing to avoid interruptions of the first available audiovisual program 40 altogether can set the threshold interest criterion to a value of 101 which, in the exemplary embodiment described above, can not be satisfied by any available audiovisual programs. Persons skilled in the art can provide other structure and methods to temporarily limit or disable the interruption of the viewing of the first available audiovisual program 40 by the system controller 100 in accordance with embodiments of the present invention.

In certain embodiments of the present invention, the system controller 100 is further responsive to the interrupt signal 92 to pause presenting the first available audiovisual program 40. In embodiments in which the first available audiovisual program 40 is a stored audiovisual program 46 being played back from the disk drive 50, the system controller 100 can respond to the interrupt signal 92 by temporarily halting the display of the first available audiovisual program 40 while the information regarding the available audiovisual programs is presented on the display device 30 to the user. In embodiments in which the first available audiovisual program 40 is a broadcasted audiovisual program 44 received from the broadcast source 20, the system controller 100 can respond to the interrupt signal 92 by storing the first available audiovisual program 40 on the disk drive 50 while the information regarding the available audiovisual programs is presented on the display device 30 to the user.

In certain embodiments, the system controller 100 interrupts the presentation of the first available audiovisual program 40 only at certain predetermined times which can be set by user input 70. For example, the user may choose to be notified once every hour of any newly available audiovisual programs estimated to be of interest. Alternatively, in other embodiments, the user may choose to be notified only when the system controller 100 is prompted by user input 70. In still other embodiments, the system controller 100 can be configured to notify the user whenever the broadcast schedule is modified.

In response to the information presented to the user regarding the available audiovisual programs, in certain embodiments the user can provide user input 70 to the system controller 100 to select which available audiovisual programs will be displayed on the display device 30 or stored on the disk drive 50. The user can choose to have the system controller 100 continue presenting the first available audiovisual program 40 to the user, despite there being other available audiovisual programs with higher estimated degrees of interest to the user. In certain such embodiments, the user can also choose to have the system controller 100 store one of the other available audiovisual programs on the disk drive 50.

Alternatively, the user can choose to have the system controller 100 begin presenting a second available audiovisual programs on the display device 30. In certain such embodiments, the user can also choose to have the system controller 100 concurrently store the first available audiovisual program 40 on the disk drive 50 for later viewing. In yet other such embodiments, the user can also choose to have the system controller 100 store a third available audiovisual program on the disk drive 50 while the second available audiovisual program is being presented on the display device 30. Persons skilled in the art are able to configure the system controller 100 to respond to user input 70 to provide storage and display options in accordance with embodiments of the present invention.

Figure 5:
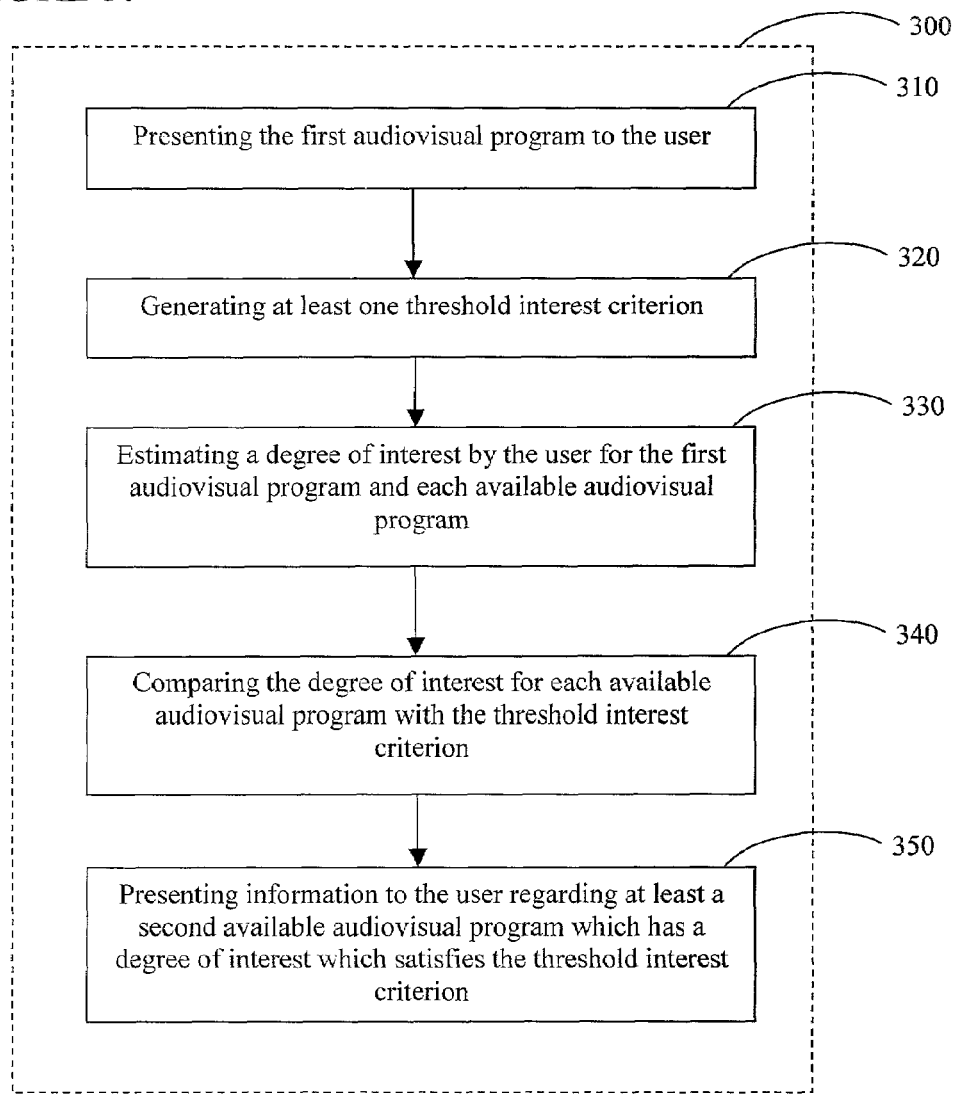
FIG. 5 is a flowchart which illustrates a method in accordance with an embodiment of the present invention.

FIG. 5 is a flowchart which illustrates one embodiment of a method 300 of allowing a user to select among available audiovisual programs while viewing a first audiovisual program 40 on a display device 30 coupled to an audiovisual system 10. The method 300 illustrated in FIG. 5 is discussed below primarily with reference to the embodiment of the audiovisual system 10 schematically illustrated in FIG. 1. Persons skilled in the art appreciate that while the flowchart illustrated in FIG. 5 presents the procedural blocks in a particular sequence, other embodiments with other sequences of the procedural blocks are compatible with the present invention.

As shown in FIG. 5, the method 300 includes a procedure block 310 which comprises presenting the first audiovisual program 40 to the user. As described above, the first audiovisual program 40 is one of the available audiovisual programs which includes stored audiovisual programs 46 retrieved from the disk drive 50 of the audiovisual system 10 and broadcasted audiovisual programs 44 received from a broadcast source 20.

The method 300 further includes a procedure block 320 which comprises generating at least one threshold interest criterion. As described above, in certain embodiments multiple interest criteria can be generated corresponding to multiple users of the audiovisual system 10. In certain embodiments, the threshold interest criterion can be generated based on set values specified by the user, based on the estimated degree of interest by the user for the first audiovisual program 40, or based on a combination of the two.

The method 300 further includes a procedure block 330 which comprises estimating a degree of interest by the user for the first audiovisual program 40 and each available audiovisual program. As described above, in certain embodiments the degrees of interest of multiple users can be estimated.

The method 300 further includes a procedure block 340 which comprises comparing the degree of interest for each available audiovisual program with the threshold interest criterion. As described above, this comparison determines which of the available audiovisual programs have a sufficient estimated degree of interest to warrant notifying the user of the availability of the available audiovisual program.

The method 300 further includes a procedure block 350 which comprises presenting information to the user regarding at least a second available audiovisual program which has a degree of interest which satisfies the threshold interest criterion. As described above, in certain embodiments, presenting the information can comprise pausing the presentation of the first audiovisual program 40 to the user. In certain such embodiments in which the first audiovisual program 40 is one of the broadcasted audiovisual programs 44, pausing the presentation of the first audiovisual program 40 to the user comprises storing the first audiovisual program 40 on the disk drive 50.

What is claimed is:

1. An audiovisual system for making audiovisual programs available to a user from a broadcast source and from local storage and for presenting on a display device a first available audiovisual program selected from the available audiovisual programs, the audiovisual system comprising:

a disk drive adapted to receive and store audiovisual programs and to retrieve and transmit stored audiovisual programs;

a preference determination module responsive to user input and electronic program guide information to estimate a degree of interest by the user for each available audiovisual program, wherein the available audiovisual programs include broadcasted audiovisual programs available to be received from the broadcast source and stored audiovisual programs available to be played back from the local storage;

an alert module coupled to the preference determination module, the alert module performing a comparison of the degree of interest for each available audiovisual program to at least one threshold interest criterion and generating an interrupt signal in response to the comparison; and a system controller coupled to the alert module, the system controller responsive to user input and electronic program guide information to present the first available audiovisual program to the user, and responsive to the interrupt signal from the alert module to interrupt presenting the first available audiovisual program to provide information to the user regarding at least a second available audiovisual program.

2. The audiovisual system of claim 1, wherein the system controller is further responsive to the interrupt signal to pause presenting the first available audiovisual program.

3. The audiovisual system of claim 1, wherein the first available audiovisual program is a stored audiovisual program.

4. An audiovisual system for making audiovisual programs available to a user from a broadcast source and from local storage and for presenting on a display device a first available audiovisual program selected from the available audiovisual programs, the audiovisual system comprising:

a disk drive adapted to receive and store audiovisual programs and to retrieve and transmit stored audiovisual programs;

a preference determination module responsive to user input and electronic program guide information to estimate a degree of interest by the user for each available audiovisual program;

an alert module coupled to the preference determination module, the alert module generating an interrupt signal in response to the degrees of interest of the available audiovisual programs; and a system controller coupled to the alert module, the system controller responsive to user input and electronic program guide information to present the first available audiovisual program to the user, and responsive to the interrupt signal from the alert module to interrupt presenting the first available audiovisual program to provide information to the user regarding at least a second available audiovisual program, wherein the first available audiovisual program is a broadcasted audiovisual program received from the broadcast source and the system controller is further responsive to the interrupt signal to store the first available audiovisual program on the disk drive while providing information to the user regarding the available audiovisual program.

5. The audiovisual system of claim 1, wherein the available audiovisual programs comprise broadcasted audiovisual programs available to be received from the broadcast source within a predetermined time window and stored audiovisual programs.

6. The audiovisual system of claim 1, wherein the alert module is further responsive to user input to generate the at least one threshold interest criterion, whereby the interrupt signal is not transmitted to the system controller unless the degree of interest for an available audiovisual program satisfies the threshold interest criterion.

7. The audiovisual system of claim 1, wherein the alert module generates the interrupt signal in response to the degree of interest of the first available audiovisual program.

8. The audiovisual system of claim 7, wherein the estimated degree of interest of the second available audiovisual program is higher than the estimated degree of interest of the first available audiovisual program.

9. The audiovisual system of claim 1, wherein the system controller is further responsive to user input to continue presenting the first available audiovisual program to the user.

10. The audiovisual system of claim 1, wherein the system controller is further responsive to user input to begin presenting the second available audiovisual program to the user.

11. The audiovisual system of claim 10, wherein the system controller is further responsive to user input to store the first available audiovisual program on the disk drive.

12. The audiovisual system of claim 10, wherein the system controller is further responsive to user input to store a third available audiovisual program on the disk drive.

13. A method of allowing a user to select among available audiovisual programs while viewing a first audiovisual program on a display device coupled to an audiovisual system, the method comprising:

presenting the first audiovisual program to the user;

generating at least one threshold interest criterion;

estimating a degree of interest by the user for the first audiovisual program and each available audiovisual program, wherein the available audiovisual programs include broadcasted audiovisual programs available to be received from the broadcast source and stored audiovisual programs available to be played back from the local storage;

comparing the degree of interest for each available audiovisual program with the threshold interest criterion; and presenting information to the user regarding at least a second available audiovisual program which has a degree of interest which satisfies the threshold interest criterion.

14. The method of claim 13, further comprising pausing the presentation of the first audiovisual program to the user.

15. The method of claim 14, wherein pausing the presentation of the first audiovisual program to the user comprises storing the first audiovisual program.

16. The method of claim 13, wherein the first audiovisual program is a stored audiovisual program retrieved from a disk drive of the audiovisual system.

17. The method of claim 13, wherein the first audiovisual program is a broadcasted audiovisual program received from a broadcast source, and the method further comprises storing the first audiovisual program while presenting information to the user.

18. The method of claim 13, wherein the available audiovisual programs comprise broadcasted audiovisual programs available to be received from the broadcast source within a predetermined time window and stored audiovisual programs.

* * * * *